United States Patent [19]
Iwama

[11] Patent Number: 5,349,454
[45] Date of Patent: Sep. 20, 1994

[54] PLASMA ADDRESSING ELECTRO-OPTICAL DEVICE HAVING INVERTOR CIRCUIT CONNECTED TO ANODES

[75] Inventor: Jun Iwama, Kanagawa, Japan

[73] Assignee: Sony Corporation, Tokyo, Japan

[21] Appl. No.: 50,647

[22] Filed: Apr. 22, 1993

[30] Foreign Application Priority Data

Apr. 24, 1992 [JP] Japan .................................. 4-131822

[51] Int. Cl.$^5$ ..................... G02F 1/133; G09G 3/28; G09G 3/36
[52] U.S. Cl. ........................................ 359/54; 359/55; 359/85; 345/60; 345/87
[58] Field of Search .................... 359/54, 55, 74, 79, 359/85, 87; 345/60, 213, 87, 209; 315/169.4; 313/517, 582

[56] References Cited
U.S. PATENT DOCUMENTS

| | | | |
|---|---|---|---|
| 4,896,149 | 1/1990 | Buzak et al. | 345/60 |
| 5,077,553 | 12/1991 | Buzak | 345/60 |
| 5,272,472 | 12/1993 | Buzak | 345/60 |

Primary Examiner—William L. Sikes
Assistant Examiner—Tai V. Duong
Attorney, Agent, or Firm—Hill, Steadman & Simpson

[57] ABSTRACT

A plasma addressing electro-optical device which can be driven at a comparatively low voltage is disclosed. A plurality of signal electrodes are formed on an inner surface of an upper glass substrate. A plurality of plasma electrodes as anodes and cathodes are formed on an inner surface of a lower glass substrate and extend perpendicularly to the signal electrodes. A liquid crystal layer is filled between the upper glass substrate and an intermediate dielectric sheet. A plasma chamber is provided between the dielectric sheet and the lower glass plate, and ionizable gas is enclosed in the plasma chamber. The gas is selectively ionized by discharge between the cathodes and the anodes, and taking the discharge regions, in which the ionized gas exists locally, as scanning units, the liquid crystal layer positioned at intersecting positions between the signal electrodes and the discharge regions is driven. A driver circuit for such driving includes an invertor circuit which inverts an image signal to be applied to the signal electrodes and a potential to the anodes at a time with reference to a potential of a substantially middle level of a driving voltage for the signal electrodes.

10 Claims, 4 Drawing Sheets

PLASMA ADDRESSING ELECTRO-OPTICAL DEVICE HAVING INVERTOR CIRCUIT CONNECTED TO ANODES

BACKGROUND OF THE INVENTION

1. Field of the Invention

This invention relates to a plasma addressing electro-optical device having a two-layer structure including two layers of an electro-optical cell such as a liquid crystal cell and a plasma cell, and more particularly to a driving method by which a plasma addressing electro-optical device of the type mentioned can be driven at a comparatively low voltage.

2. Description of the Related Art

An electro-optical device of the matrix type which employs a liquid crystal cell as an electro-optical cell such as, for example, a liquid crystal display device, conventionally employs, as commonly known means for assuring a high resolution and a high contrast, an active matrix addressing system wherein a switching element such as a thin film transistor is provided for each picture element and the switching elements are driven in a line sequential condition. However, according to the active matrix addressing system, it is necessary to provide a large number of semiconductor elements such as thin film transistors on a substrate. Accordingly, the active matrix addressing system is disadvantageous in that, when the substrate has a large area, the yield in production is low.

A solution to the disadvantage has been proposed by Buzak et al. and is disclosed in Japanese Patent Laid-Open Application No. Heisei 1-217396 (corresponding to U.S. Pat. No. 4,896,149 and No. 5,077,553) wherein a plasma switch is employed in place of a switching element formed from a thin film transistor or a like element. Now, general construction of a plasma addressing display device wherein a liquid crystal cell is driven making use of switches based on plasma discharge is described briefly. Referring to FIG. 3, the plasma addressing display device is shown and has a layered flat panel structure which includes a liquid crystal cell 101, a plasma cell 102 and a dielectric sheet 103 interposed between the liquid crystal cell 101 and the plasma cell 102. The plasma cell 102 is formed using a glass substrate 104 and has a plurality of parallel channels 105 formed on a surface thereof. The channels 105 extend, for example, in a direction along the rows of the matrix. The channels 105 are individually closed by the dielectric sheet 103 to define plasma chambers 106 which are individually separate from each other. Ionizable gas is enclosed in the plasma chambers 106. A convex portion 107 of the glass substrate 104 is disposed between each adjacent ones of the channels 105 and serves as a barrier rib for isolating the adjacent plasma chambers 106 from each other and also as a gap spacer for the plasma chambers 106. A pair of parallel plasma electrodes 108 and 109 are provided on a bottom surface of each of the channels 105. The pair of electrodes function as an anode and a cathode to ionize the gas in the plasma chamber 106 to produce discharge plasma. Such discharge area makes a row scanning unit.

Meanwhile, the liquid crystal cell 101 is constructed using a transparent substrate 110. The transparent substrate 110 is disposed in an opposing relationship to the dielectric sheet 103 with a predetermined gap left therebetween, and a liquid crystal layer 111 is filled in the gap. Signal electrodes 112 made of a transparent conducting material are formed on an inner surface of the transparent substrate 110. The signal electrodes 112 extend perpendicularly to the plasma chambers 106 and make column driving units. Picture elements in a matrix are defined at intersecting positions between the column driving units and the row scanning units.

In the display device having such a construction as described above, the plasma chambers 106 in which plasma discharge occurs are switched to be scanned in a line sequential condition while an image signal is applied to the signal electrodes 112 of the liquid crystal cell side in synchronism with such scanning to effect display driving of the display apparatus. If plasma discharge occurs in a plasma chamber 106, the potential of the inside of the plasma chamber 106 is put substantially uniformly to that of the anode A so that picture element selection of each row is performed. In other words, each of the plasma chamber 106 functions as a sampling switch. If an image signal is applied to each picture element while the plasma sampling switch is in an on state, then sampling holding is performed so that lighting or extinction of the picture element can be controlled. Also after the plasma sampling switch is put into an off condition, the image signal is held as it is in the picture element.

By the way, if plasma discharge occurs, then a difference between the anode potential and a potential at the signal electrodes is applied to the two-layer structure of the liquid crystal layer 111 and the dielectric sheet 103. Accordingly, the voltage actually applied to the liquid crystal layer 11 is equal to the difference divided in accordance with a ratio between the capacitance of the liquid crystal layer and the capacitance of the dielectric sheet. Taking such potential drop caused by the division in capacitance into account, a high voltage corresponding to ten times or so the voltage necessary for actual driving is added to the signal electrodes. Further, in order to prevent possible deterioration of the liquid crystal, it must be driven by ac current. Conventionally, the polarity of the driving voltage to be applied to the signal electrodes is inverted, for example, for each frame with reference to or with respect to an anode potential. Consequently, a power supply voltage corresponding to about twice the voltage necessary for actual driving of the liquid crystal is required, and since such inversion in polarity is involved in addition to the voltage drop by the division in capacitance described above, the actual driving voltage becomes very high. Consequently, a high load is provided in construction of a liquid crystal driving circuit. Thus, the conventional display device described above has a subject or problem to be solved in that it is difficult to form the device as an integrated circuit.

SUMMARY OF THE INVENTION

It is an object of the present invention to provide a plasma addressing electro-optical device which can be driven at a comparatively low voltage.

In order to attain the object described above, according to an aspect of the present invention, there is provided a plasma addressing electro-optical device, which comprises a first substrate having a plurality of first electrodes arranged substantially in parallel to each other on a major surface thereof, a second substrate having a plurality of second electrodes to define addressing units each including an anode and a cathode in pair to thereby define overlapping regions of the first electrodes and the addressing units, an electro-optical material layer positioned between the first and second substrates, ionizable gas contained in a discharge chamber formed between the electro-optical material layer and the second substrate, a signal generating circuit for providing to the first electrodes a signal which is inverted with reference to a predetermined potential, and means for provide to the anodes an anode potential which is inverted in synchronism with the inversion of the signal.

Preferably, the predetermined potential is a substantially middle potential of a driving voltage for the electro-optical material layer.

Preferably, the plasma addressing electro-optical device further comprises a dielectric material layer disposed between the electro-optical material layer and the discharge chamber to isolate the electro-optical material layer from the ionizable gas.

Preferably, the plasma addressing electro-optical device further comprises a plurality of barrier rib elements formed on the second electrodes so as to support the dielectric material layer thereon.

The inversion of the signal may occur for each frame.

The electro-optical material layer may contain liquid crystal therein.

The overlapping regions may define a dimension of a display element.

In the plasma addressing electro-optical device, for a certain frame period, the image signal has the positive polarity while the anode potential has the negative polarity. Accordingly, a driving voltage of the positive polarity conforming to a difference between them is applied to the electro-optical material layer or liquid crystal layer, or more accurately, to the picture elements. In a next frame, the image signal is inverted to the negative polarity side while the anode potential is inverted to the positive polarity side. Accordingly, a driving voltage of the negative polarity conforming to a difference between them is applied to the picture elements. The driving voltage is inverted for each frame in this manner to effect ac current driving. In this instance, in order to prevent application of a dc component, the reference voltage for inversion of the image signal and the reference voltage for inversion of the anode potential are made coincide with each other. Since the potential of the signal electrodes, that is, the signal potential, and the anode potential are inverted alternately, it is sufficient if a power supply voltage which corresponds to a maximum voltage value necessary for actual driving of the picture elements is prepared. In contrast, if a predesignal potential is oscillated between the positive polarity side and the negative polarity side with respect to a fixed anode potential as in the conventional display device, a power supply voltage corresponding to twice the voltage necessary for actual driving is required. Consequently, with the plasma addressing electro-optical device of the present invention, polarity inversion necessary for ac driving of the liquid crystal layer can be performed with a driving voltage which is one half that required in the conventional plasma addressing electro-optical device.

According to another aspect of the present invention, there is provided a method of driving an electro-optical display device of the type which includes a plurality of signal electrodes extending in parallel along a column direction, a plurality of addressing units activated by plasma discharge and each having an anode and a cathode for selectively ionizing gas, and a plurality of display elements arranged at intersections of the signal electrodes and the addressing units, which comprises the steps of supplying a signal, which is inverted with respect to a predetermined potential, to the signal electrodes, and applying an anode potential, which is inverted in synchronism with the inversion of the signal, to the anodes. Preferably, the predetermined potential is a substantially middle potential of a driving voltage for the electro-optical display device. The inversion may occur for every frame.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
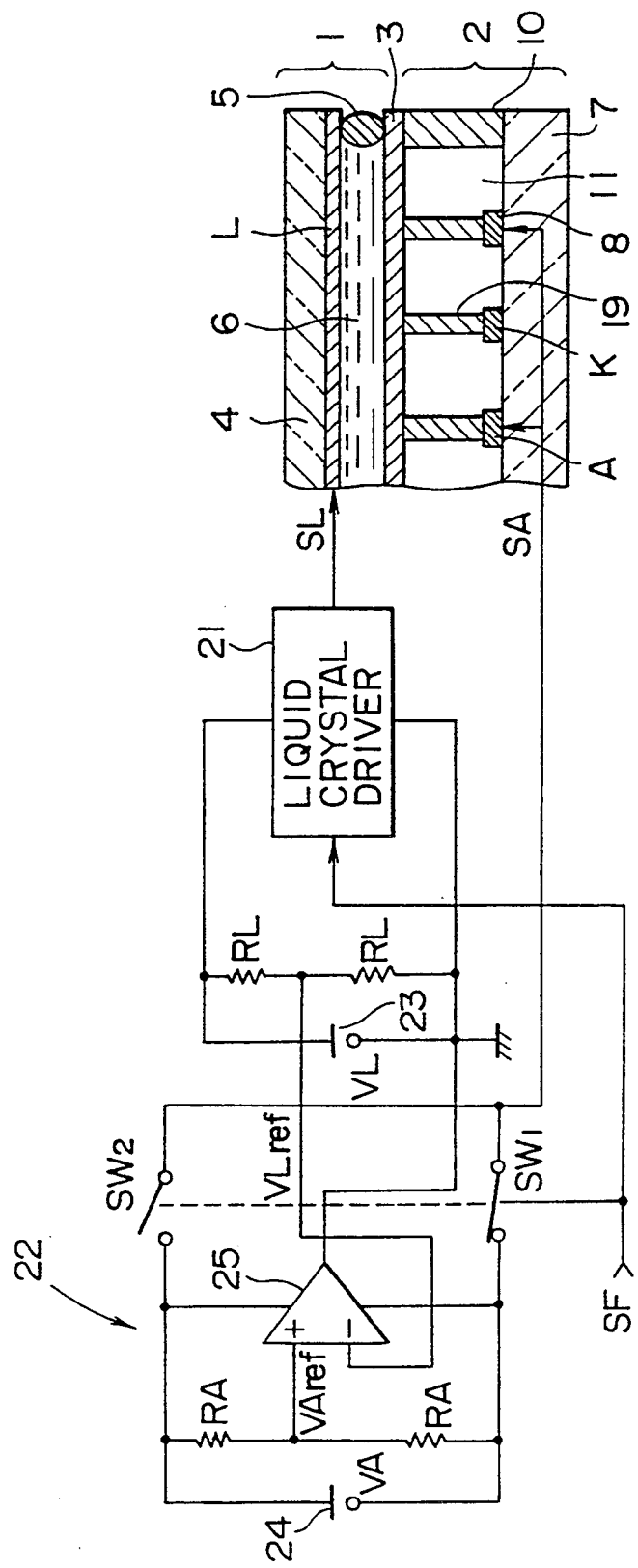
FIG. 1 is a schematic diagrammatic view showing basic construction of a plasma addressing electro-optical device according to the present invention.

Referring first to FIG. 1, there is shown basic construction of a plasma addressing electro-optical device according to the present invention. More particularly, a plasma addressing panel of the plasma addressing electro-optical device and a driver circuit externally connected to the plasma addressing electro-optical device are shown. The plasma addressing panel shown has a structure wherein a liquid crystal cell 1, a plasma cell 2 and a very thin dielectric sheet 3 are layered with the dielectric sheet 3 interposed between the liquid crystal cell 1 and the plasma cell 2. The liquid crystal cell 1 is constructed using a glass substrate 4, and a plurality of signal electrodes L formed from a transparent conductive film are formed in parallel to each other along the direction of a row on an inner major surface of the glass substrate 4 and make column driving units. The substrate 4 is adhered to the dielectric sheet 3 with a predetermined gap left therebetween, and a liquid crystal layer 6 as an electro-optical material layer is filled in the gap. In the present embodiment, an electro-optical material in the form of fluid is employed, but the electro-optical material is not necessarily limited to such a specific material. For example, an electro-optical crystal plate may be employed. Further, while the present embodiment relates to a plasma addressing display device, the present invention is not limited to such plasma addressing display device but can be applied widely to various plasma addressing electro-optical devices such as an optical modulating device.

Meanwhile, the plasma cell 2 is constructed using a lower glass substrate 7. A plurality of plasma electrodes 8 are formed on an inner major surface of the substrate 7 and extend perpendicularly to the signal electrodes L. The plasma electrodes 8 alternatively exhibit functions of the anodes A and the cathodes K. A barrier rib 9 is provided in register with each of the plasma electrodes 8, and the top thereof is held in contact with the dielectric sheet 3. The substrate 7 is adhered to the dielectric sheet 3 using a seal member 10. A plasma chamber 11 sealed airtight is formed between the substrate 7 and the dielectric sheet 3, and ionizable gas is enclosed in the plasma chamber 11. The gas may be selected from, for example, helium, neon, argon or any mixture of the gases. The plasma chamber 11 is divided by the barrier ribs 9 to construct discharge regions which individually make row scanning units. Display picture elements are constructed between the row scanning units and the column driving units formed from the signal electrodes L.

On the other hand, the driver circuit includes a liquid crystal driver 21 for supplying an image signal SL to the signal electrodes L, and an invertor circuit 22 for applying a predetermined potential SA to the anodes A. The liquid crystal driver 21 receives supply of power from a constant-voltage power source 23 having a predetermined output voltage VL. Consequently, the liquid crystal driver 21 can output a driving voltage ranging from almost 0 volt to the VL volt. An inversion signal SF is supplied to the liquid crystal driver 21 so that the output signal SL of the liquid crystal driver 21 is inverted with respect to a reference voltage VLref which corresponds to about one half the VL volt in accordance with the inversion signal SF. It is to be noted that the reference voltage VLref is provided at a middle point between a pair of resistors RL connected in series across the power source 23.

The invertor circuit 22 includes a constant-voltage power source 24 having a predetermined output voltage VA, and a pair of switches SW1 and SW2 are connected to the opposite ends of the constant-voltage power source 24. The pair of switches SW1 and SW2 are changed over alternately in response to the inversion signal SF to supply the anode potential SA to the anodes A. A pair of resistors RA connected in series are interposed across the constant-voltage power source 24, and a reference voltage VAref is provided at a middle point between the resistors RA. Further, the reference voltage VAref is applied to the positive input terminal of a comparator 25 while the other reference voltage VLref is applied to the other negative input terminal of the comparator 25, and the output terminal of the comparator 25 is grounded. The inversion reference voltages VAref and VLref are made coincide with each other on the liquid crystal cell 1 side and the plasma cell 2 side by an action of the comparator 25.

Figure 2:
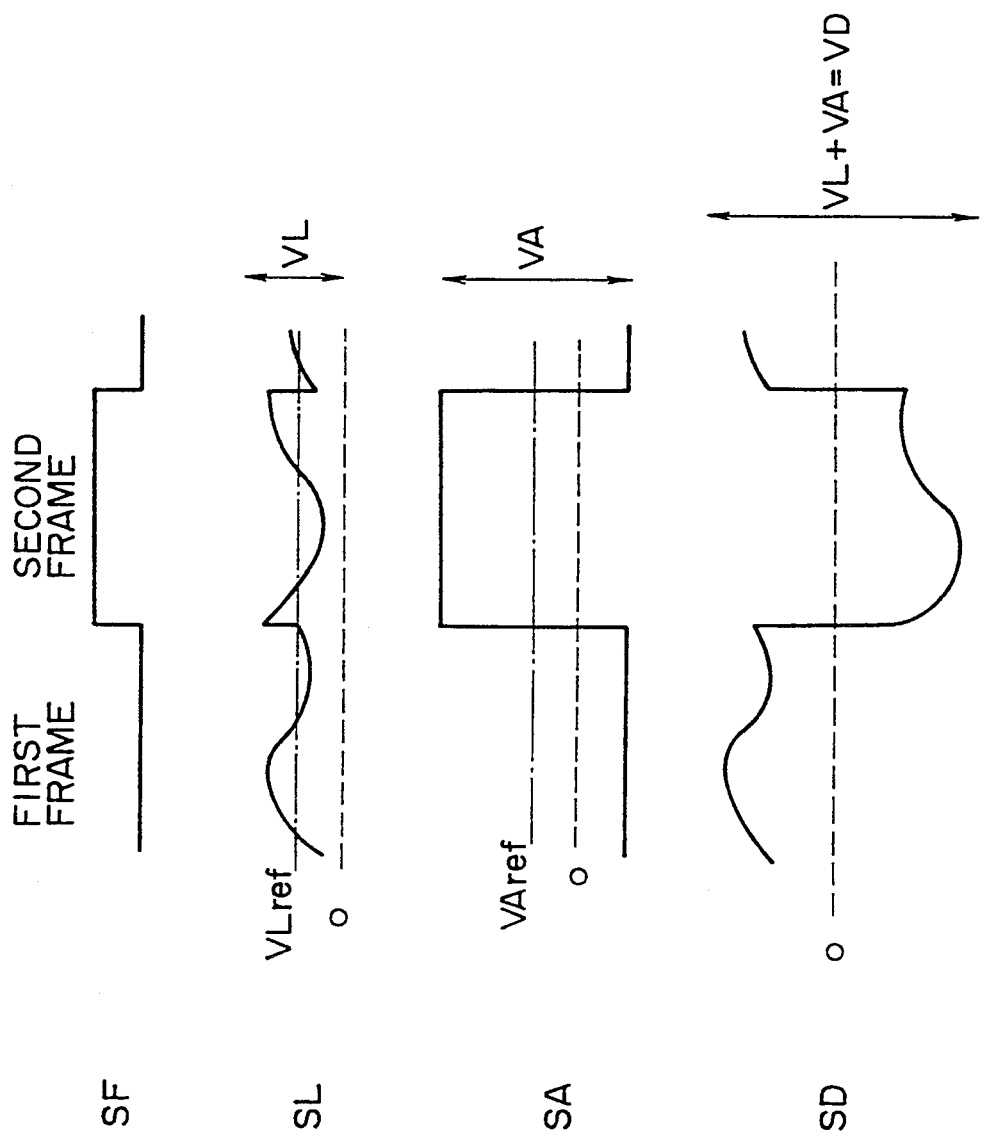
FIG. 2 is a waveform diagram illustrating operation of the plasma addressing electro-optical device shown in FIG. 1.

Operation of the driver circuit shown in FIG. 1 will be described in detail with reference to the waveform diagram of FIG. 2. The inversion signal SF has a signal level which varies for each frame in response to, for example, a vertical synchronizing signal. The image signal SL includes an ac signal component such as a video signal. The ac signal component is inverted with respect to the predetermined reference voltage VLref in synchronism with the inversion signal SF. The amplitude range of the ac signal component is given almost by VL. Similarly, also the anode potential SA is inverted for each frame with reference to the predetermined reference voltage VAref in synchronism with the inversion signal SF. The inversion range is given almost by VA. In a first frame, the anode potential SA is on the negative polarity side with respect to the reference voltage VAref while the image signal SL has the positive polarity with respect to the reference voltage VLref. Subsequently in a second frame, the anode potential SA is inverted to the positive polarity side while the image signal SL is inverted to the negative polarity with respect to the reference voltage VLref. As described hereinabove, a difference between the image signal SL and the anode potential SA is applied as a driving signal SD to each of the display picture elements. If the driving signal SD is represented with reference to the anode potential, then an amplitude level ranging over VL+VA=VD is obtained. In other words, if inversion in polarity is taken into consideration, then driving effectively over VL+VA=VD can be performed by a liquid crystal driver which outputs the driving voltage VL. Further, even if the driving voltage VL and the output voltage VA of the power source 24 are adjusted arbitrarily, the condition of ac driving is maintained by operation of the comparator 25. Generally, the driving voltage VL is set to 40 volts or so while the output voltage VA the power source 24 is set to 60 volts or so. Accordingly, the driving voltage VD which is a sum of them is 100 volts or so and is applied to each picture element. It is to be noted that, since each display picture element has a capacitance of the liquid crystal and another capacitance of the dielectric sheet, the driving voltage to be actually applied to the liquid crystal layer is reduced to about 1/10, that is, to 10 volts by the capacitance division then. By the way, the liquid crystal layer has an insensitive zone between 0 volt and a threshold voltage at which response is started. Since the liquid crystal driving voltage can apparently be made high according to the present invention, the insensitive zone can be subtracted from the amplitude necessary for the liquid crystal driver, and consequently, the driving voltage for the liquid crystal driver can be reduced effectively.

Figure 3:
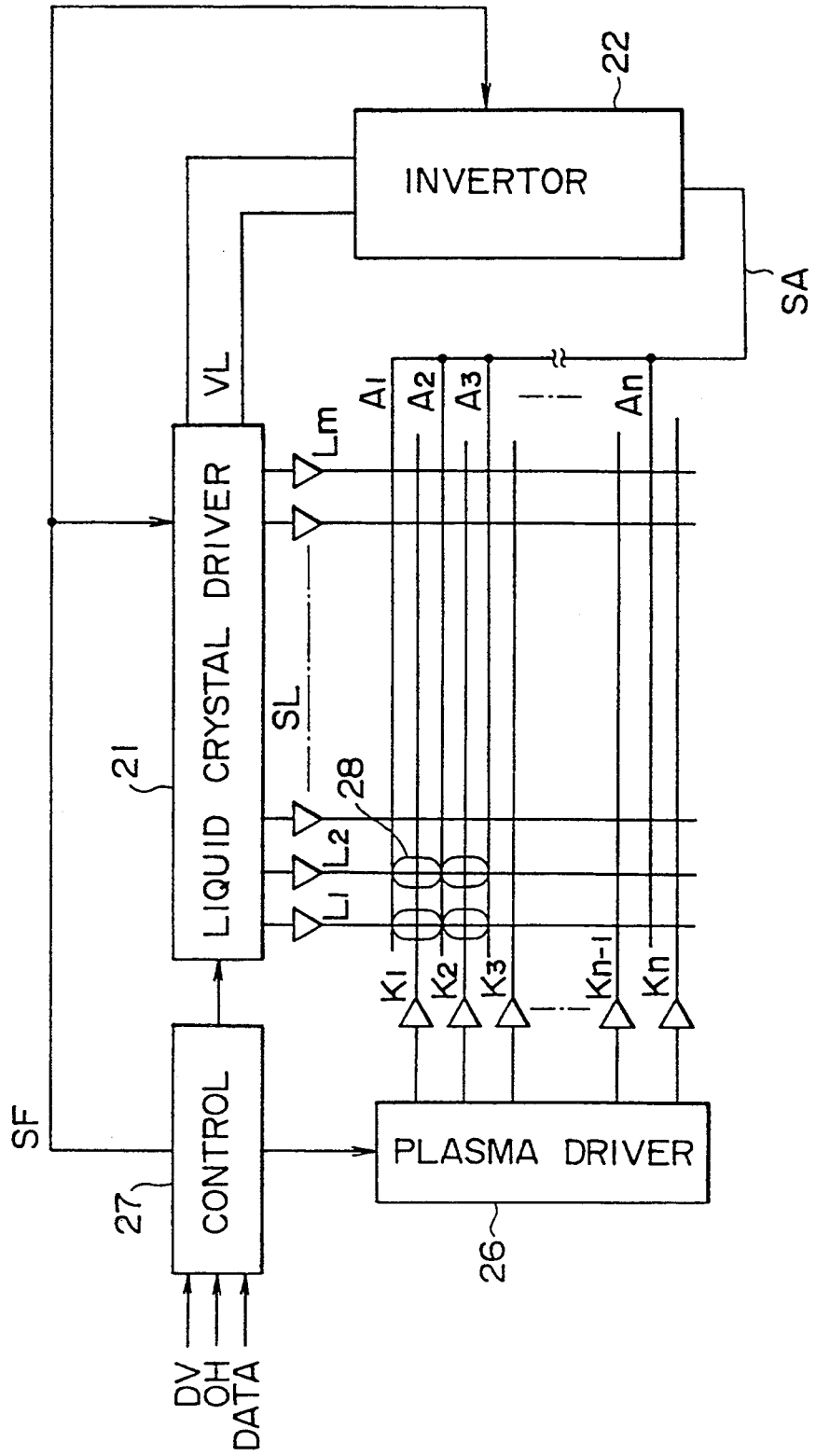
FIG. 3 is a block circuit diagram showing the entire circuit of the plasma addressing electro-optical device shown in FIG. 1.
Figure 4:
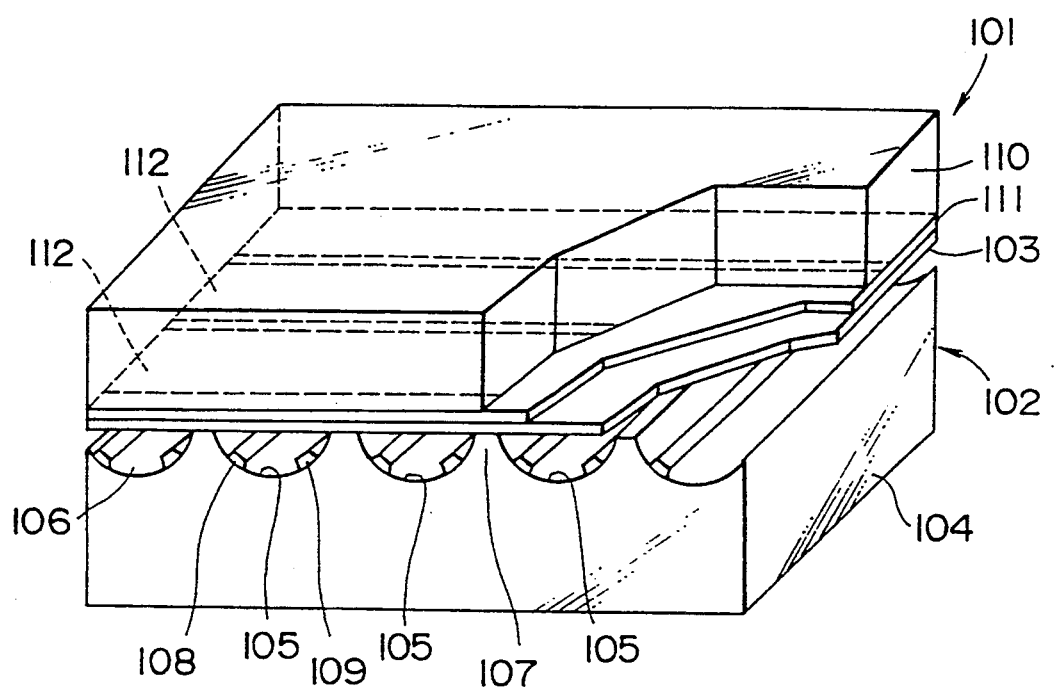
FIG. 4 is a perspective view, partly broken, showing an example of conventional plasma addressing electro-optical device.

Referring finally to FIG. 3, there is shown the entire circuit construction of the plasma addressing electro-optical device according to the present invention. The driver circuit shown includes, in addition to the liquid crystal driver 21 and the invertor circuit 22, a plasma driver 26 and a control circuit 27. A plurality of signal electrodes L1 to Lm are connected to the liquid crystal driver 21 each by way of a buffer. Meanwhile, a plurality of cathodes K1 to Kn are connected to the plasma driver 26. The anodes A1 to An are connected to the invertor circuit 22 as described hereinabove and receive supply of an anode potential SA which is inverted for each frame. The cathodes K1 to Kn are scanned in a line sequential relationship by the plasma driver 26, and the liquid crystal driver 21 supplies an image signal SL to the signal electrodes L1 to Lm in synchronism with such line sequential scanning. The control circuit 27 receives a vertical synchronizing signal DV, a horizontal synchronizing signal DH, video data DATA and so forth and effects synchronizing control of the liquid crystal driver 21 and the plasma driver 26. Along each cathode, a pair of plasma discharge regions are formed between the cathode and a pair of anodes on the opposite sides of the cathode and make row scanning units. Meanwhile, the signal electrodes make column driving units. Display picture elements 28 are defined between the row scanning units and the column driving units.

The control circuit 27 outputs an inversion signal SF described above in response to, for example, the vertical synchronizing signal DV. The polarity of the image signal SL to be outputted from the liquid crystal driver 21 is inverted in response to the inversion signal SF. Simultaneously, also the anode potential SA to be supplied from the invertor circuit 22 is inverted. It is to be noted that also the discharge voltage to be applied to each cathode is shifted in level in response to the inversion of the anode potential. Usually, a potential difference of 200 volts or so is required between the anode and the cathode.

Having now fully described the invention, it will be apparent to one of ordinary skill in the art that many changes and modifications can be made thereto without departing from the spirit and scope of the invention as set forth herein.

What is claimed is:

1. A plasma addressing electro-optical device, comprising:
    a first substrate having a plurality of first electrodes arranged substantially in parallel to each other on a major surface thereof;
    a second substrate having a plurality of second electrodes to define addressing units each including an anode and a cathode in pair to thereby define overlapping regions of the first electrodes and the addressing units;
    an electro-optical material layer positioned between said first and second substrates;
    a discharge chamber formed between said electro-optical material layer and said second substrate and containing ionizable gas;
    a signal generating circuit for providing a signal to the first electrodes, said signal being inverted on the basis of a predetermined potential; and
    means for providing an anode potential which is inverted in synchronism with the inversion of the signal.

2. A plasma addressing electro-optical device as claimed in claim 1, wherein the predetermined potential is a substantially middle potential of a driving voltage for said electro-optical material layer.

3. A plasma addressing electro-optical device as claimed in claim 1, further comprising a dielectric material layer disposed between said electro-optical material layer and said discharge chamber to isolate said electro-optical material layer from said ionizable gas.

4. A plasma addressing electro-optical device as claimed in claim 1, further comprising a plurality of barrier rib elements formed on said second electrodes so as to support said dielectric material layer thereon.

5. A plasma addressing electro-optical device as claimed in claim 1, wherein the inversion of the signal occurs for each frame.

6. A plasma addressing electro-optical device as claimed in claim 1, wherein said electro-optical material layer contains liquid crystal therein.

7. A plasma addressing electro-optical device as claimed in claim 1, wherein said overlapping regions define a dimension of a display element.

8. A method of driving an electro-optical display device of the type which includes a plurality of signal electrodes extending in parallel along a column direction, a plurality of addressing units activated by plasma discharge and each having an anode and a cathode for selectively ionizing gas, and a plurality of display elements arranged at intersections of said signal electrodes and said addressing units, said method comprising the steps of:
    supplying a signal, which is inverted with respect to a predetermined potential, to said signal electrodes; and
    applying an anode potential, which is inverted in synchronism with the inversion of the signal, to the anodes.

9. A method as claimed in claim 8, wherein said predetermined potential is a substantially middle potential of a driving voltage for said electro-optical display device.

10. A method as claimed in claim 8, wherein the inversion occurs for every frame.

* * * * *